United States Patent
Chang

Patent Number: 6,045,950
Date of Patent: Apr. 4, 2000

[54] SOLVENT FOR ELECTROLYTIC SOLUTIONS

[75] Inventor: Hao Chang, Arlington, Mass.

[73] Assignee: Duracell Inc., Bethel, Conn.

[21] Appl. No.: 09/105,510

[22] Filed: Jun. 26, 1998

[51] Int. Cl.[7] .................................................. H01M 6/18
[52] U.S. Cl. ...................... 429/306; 429/324; 429/330; 429/332; 429/334; 429/341; 429/343
[58] Field of Search ..................................... 429/306, 323, 429/324, 341, 343, 231.95, 247, 330, 332, 335, 334

[56] References Cited

U.S. PATENT DOCUMENTS

| | | | |
|---|---|---|---|
| 3,676,752 | 7/1972 | Burger et al. | 317/230 |
| 3,702,426 | 11/1972 | Ross et al. | 317/230 |
| 4,008,357 | 2/1977 | Nishimura et al. | 429/142 |
| 4,246,253 | 1/1981 | Hunter | 423/605 |
| 4,302,518 | 11/1981 | Goodenough et al. | 429/104 |
| 4,312,930 | 1/1982 | Hunter | 429/191 |
| 4,357,215 | 11/1982 | Goodenough et al. | 204/2.1 |
| 4,366,215 | 12/1982 | Coetzer et al. | 429/199 |
| 4,522,737 | 6/1985 | MacNamee | 252/62.2 |
| 4,567,031 | 1/1986 | Riley | 423/593 |
| 4,604,334 | 8/1986 | Tarascon | 429/194 |
| 4,652,968 | 3/1987 | Shimamoto et al. | 361/319 |
| 4,668,595 | 5/1987 | Yoshino et al. | 429/194 |
| 4,710,439 | 12/1987 | Terascon | 429/194 |
| 4,720,439 | 1/1988 | Tarascon | 429/194 |
| 4,751,159 | 6/1988 | Tarascon | 429/194 |
| 4,770,960 | 9/1988 | Nagaura et al. | 429/194 |
| 4,828,834 | 5/1989 | Nagaura et al. | 429/194 |
| 4,943,497 | 7/1990 | Oishi et al. | 429/53 |
| 4,980,080 | 12/1990 | Lecerf et al. | 252/182.1 |
| 5,053,297 | 10/1991 | Yamahira et al. | 429/194 |
| 5,079,109 | 1/1992 | Takami et al. | 429/197 |
| 5,086,374 | 2/1992 | MacFarlane et al. | 361/525 |
| 5,110,696 | 5/1992 | Shokoohi et al. | 429/218 |
| 5,135,732 | 8/1992 | Barboux et al. | 423/593 |
| 5,147,739 | 9/1992 | Beard | 429/194 |
| 5,169,736 | 12/1992 | Bittihn et al. | 429/194 |
| 5,180,574 | 1/1993 | Von Sacken | 423/594 |
| 5,192,629 | 3/1993 | Cuyomard et al. | 429/197 |
| 5,194,341 | 3/1993 | Bagley et al. | 429/189 |
| 5,211,933 | 5/1993 | Barboux et al. | 423/596 |
| 5,219,683 | 6/1993 | Webber | 429/197 |
| 5,225,297 | 7/1993 | Garcia-Alvarado et al. | 429/220 |
| 5,246,796 | 9/1993 | Nagamine et al. | 429/194 |
| 5,264,201 | 11/1993 | Dahn et al. | 423/594 |
| 5,266,299 | 11/1993 | Tarascon | 423/599 |
| 5,284,721 | 2/1994 | Beard | 429/194 |
| 5,292,601 | 3/1994 | Sugeno et al. | 429/197 |
| 5,296,318 | 3/1994 | Gozdz et al. | 429/192 |
| 5,296,319 | 3/1994 | Bito et al. | 429/194 |
| 5,308,720 | 5/1994 | Kurokawa et al. | 429/194 |
| 5,322,746 | 6/1994 | Wainwright | 429/60 |
| 5,427,875 | 6/1995 | Yamamoto et al. | 429/223 |
| 5,429,890 | 7/1995 | Pynenburg et al. | 429/192 |
| 5,437,945 | 8/1995 | Omaru et al. | 429/197 |
| 5,449,577 | 9/1995 | Dahn et al. | 429/94 |
| 5,464,705 | 11/1995 | Wainwright | 429/61 |
| 5,472,809 | 12/1995 | Perton et al. | 429/197 |
| 5,474,752 | 12/1995 | Yamamoto | 423/596 |
| 5,478,673 | 12/1995 | Funatsu | 439/197 |

(List continued on next page.)

FOREIGN PATENT DOCUMENTS

| | | | |
|---|---|---|---|
| 56-42970 | 4/1981 | Japan | H01M 8/20 |
| 62-216171 | 9/1987 | Japan . | |
| 05074487 | 3/1993 | Japan | H01M 10/40 |
| 08148159 | 6/1996 | Japan | H01M 6/16 |
| 8-162154 | 6/1996 | Japan | H01M 10/40 |
| 8-190932 | 7/1996 | Japan | H01M 10/40 |
| 09017448 | 1/1997 | Japan . | |
| 09035714 | 2/1997 | Japan | H01M 4/58 |
| 09097609 | 4/1997 | Japan | H01M 4/58 |
| 09320601 | 12/1997 | Japan | H01M 4/58 |
| WO 98/57385 | 12/1998 | WIPO . | |

*Primary Examiner*—LaurA S. Weiner
*Attorney, Agent, or Firm*—Fish & Richardson P.C.

[57] ABSTRACT

Electrolytic solutions containing a malonate ester having no alpha-carbon hydrogen atoms are disclosed. The electrolytic solutions can be used in lithium ion batteries.

31 Claims, 1 Drawing Sheet

U.S. PATENT DOCUMENTS

| | | | |
|---|---|---|---|
| 5,478,674 | 12/1995 | Miyasaka | 429/218 |
| 5,487,960 | 1/1996 | Tanaka | 429/218 |
| 5,521,027 | 5/1996 | Okuno et al. | 429/194 |
| 5,525,443 | 6/1996 | Okuno et al. | 429/194 |
| 5,531,920 | 7/1996 | Mao et al. | 252/182.1 |
| 5,561,005 | 10/1996 | Omaru et al. | 429/197 |
| 5,569,561 | 10/1996 | Exnar et al. | 429/218 |
| 5,587,871 | 12/1996 | Ue et al. | 361/504 |
| 5,609,975 | 3/1997 | Hasegawa et al. | 429/217 |
| 5,620,812 | 4/1997 | Tahara et al. | 429/223 |
| 5,626,635 | 5/1997 | Yamaura et al. | 29/623.5 |
| 5,629,110 | 5/1997 | Kobayashi et al. | 429/223 |
| 5,631,100 | 5/1997 | Yoshino et al. | 429/62 |
| 5,631,104 | 5/1997 | Zhong et al. | 429/194 |
| 5,648,057 | 7/1997 | Ueda et al. | 423/594 |
| 5,665,212 | 9/1997 | Zhong et al. | 304/297 |
| 5,677,076 | 10/1997 | Sato et al. | 429/56 |
| 5,677,087 | 10/1997 | Amine et al. | 429/224 |
| 5,709,969 | 1/1998 | Yamahira | 429/218 |
| 5,714,280 | 2/1998 | Nakano et al. | 429/197 |
| 5,718,877 | 2/1998 | Manev et al. | 423/599 |

SOLVENT FOR ELECTROLYTIC SOLUTIONS

BACKGROUND OF THE INVENTION

The invention relates to solvents for electrolytic solutions.

Batteries are commonly used as energy sources. Typically, a battery includes a negative electrode, called the anode, a positive electrode, called the cathode, and an electrolytic solution. The battery can further include one or more layers of material, called the separator, that electrically isolate the anode from the cathode when the battery is not in use.

When the battery is used, the anode and the cathode can be electrically connected through an external path so that electrons can flow from the anode to the cathode along the external path. This can cause the anode material to be oxidized while the cathode material can be reduced. During this process, ions can flow between the electrodes through the electrolytic solution.

One type of battery is called a lithium ion battery. In this type of battery, lithium ions can be transferred from the anode through the electrolytic solution to the cathode during battery use. During battery recharge, lithium ions can flow from the cathode through the electrolytic solution to the anode. During use or recharge, lithium ion batteries can heat up.

SUMMARY OF THE INVENTION

The invention relates to solvents for electrolytic solutions. The solvents can be used in lithium ion batteries. The solvents can have relatively high flash points and/or low freezing points. Batteries containing the solvents can exhibit good thermal stability, good safety, good cyclability and good energy capacity.

In one aspect, the invention features a lithium ion battery that includes a cathode that becomes lithiated during discharge of the lithium battery, an anode, a separator disposed between the anode and the cathode, an electrolytic solution containing and a malonate ester having no alpha-carbon hydrogen atoms. As used herein, the term "malonate ester having no alpha-carbon hydrogen atoms" refers to a compound having the structure:

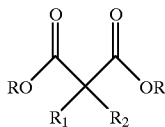

R can be a substituted or unsubstituted alkyl group. $R_1$ can be a halogen atom, a substituted alkyl group or an unsubstituted alkyl group. $R_2$ can be a halogen atom, a substituted alkyl group or an unsubstituted alkyl group. $R_1$ and $R_2$ can be the same or different.

In another aspect, the invention features a method of preparing a battery. The method includes incorporating a malonate ester having no alpha-carbon hydrogen atoms into the battery.

In another aspect, the invention features a battery that includes a cathode, an anode a separator disposed between the cathode an electrolytic solution containing and a malonate ester having no alpha-carbon hydrogen atoms.

In another aspect, the invention features an electrolytic solution that includes a malonate ester having no alpha-carbon hydrogen atoms. The electrolytic solution is at least partially contained within a battery.

Other features and advantages of the invention will be apparent from the description of the preferred embodiments thereof, and from the claims.

BRIEF DESCRIPTION OF THE DRAWING

The FIGURE is a sectional view of a lithium ion battery.

DESCRIPTION OF THE PREFERRED EMBODIMENTS

Figure 1:
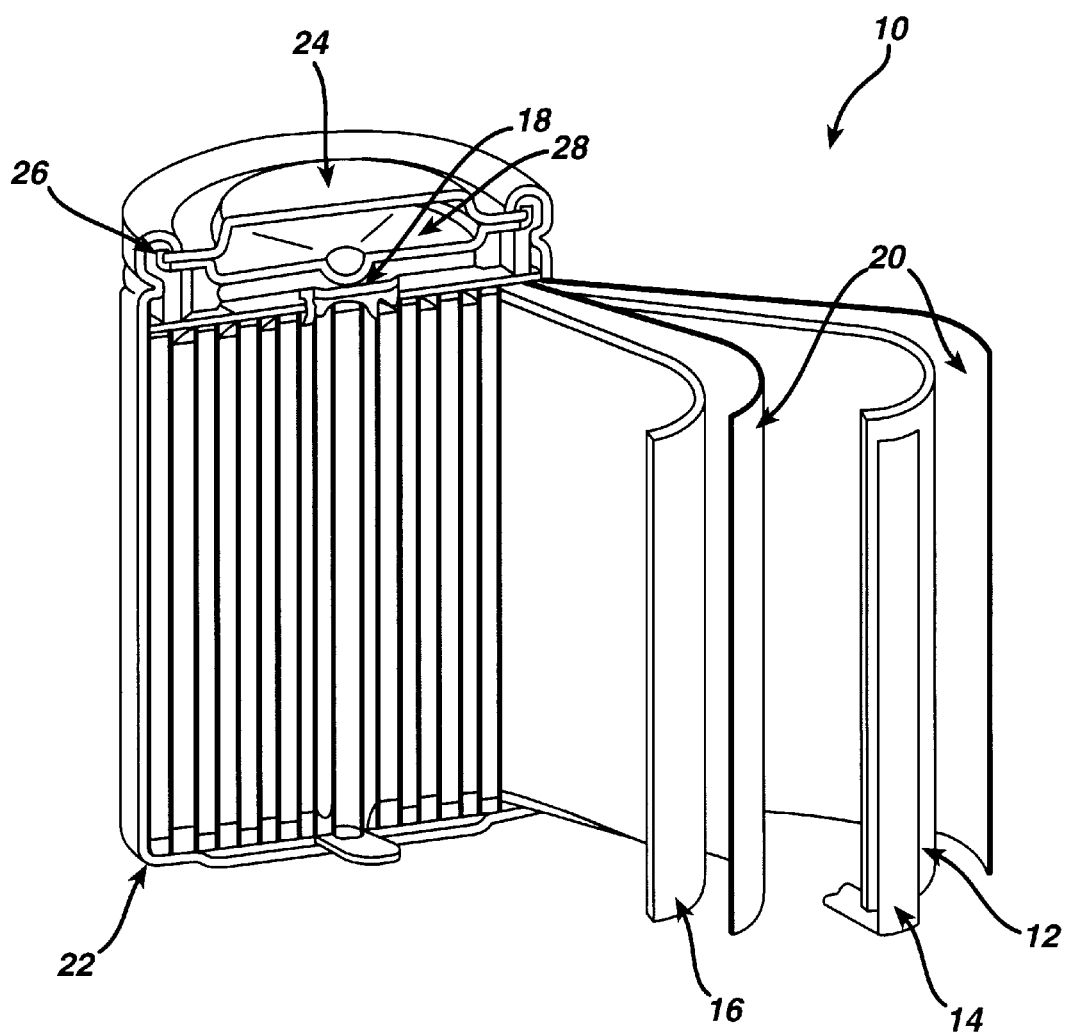

The figure shows a lithium ion battery 10 that includes an anode 12 in electrical contact with a negative lead 14, a cathode 16 in electrical contact with a positive lead 18, a separator 20 and an electrolytic solution. Anode 12, cathode 16, separator 20 and the electrolytic solution are contained within a case 22. The electrolytic solution includes a solvent system and a salt that is at least partially dissolved in the solvent system.

One end of case 22 is closed with a cap 24 and an annular insulating gasket 26 that can provide a gas-tight and fluid-tight seal. Positive lead 18 connects anode 16 to cap 24. A safety valve 28 is disposed in the inner side of cap 24 and is configured to decrease the pressure within battery 10 when the pressure exceeds some predetermined value.

The electrolytic solution contains a malonate ester having no alpha-carbon hydrogen atoms and a lithium salt.

A malonate ester having no alpha-carbon hydrogen atoms has the molecular structure:

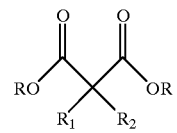

R can be an alkyl group that is substituted or unsubstituted. R can be straight-chained, branched or cyclic. Preferably, R has from one to about five carbon atoms, more preferably R has from one to two carbon atoms, and most preferably R has one carbon atom.

$R_1$ can be a halogen atom, a substituted alkyl group or an unsubstituted alkyl group. If $R_1$ is an alkyl group, it can be straight-chained, branched or cyclic. If $R_1$ is an alkyl group, $R_1$ preferably has from one to five carbon atoms, more preferably $R_1$ has from one to three carbon atoms, and most preferably $R_1$ has from one to two carbon atoms.

$R_2$ can be a halogen atom, a substituted alkyl group or an unsubstituted alkyl group. If $R_2$ is an alkyl group, it can be straight-chained, branched or cyclic. If $R_2$ is an alkyl group, $R_2$ preferably has from one to five carbon atoms, more preferably $R_2$ has from one to three carbon atoms, and most preferably $R_2$ has from one to two carbon atoms.

$R_1$ and $R_2$ can be the same or different.

Examples of malonate esters having no alpha-carbon hydrogen atoms include diethyl dimethylmalonate, diethyl diethylmalonate, dimethyl dimethylmalonate and dimethyl dimethyl malonate.

Examples of lithium salts include $LiPF_6$, $LiBF_4$, $LiAsF_6$, $LiClO_4$, $LiI$, $LiBr$, $LiAlClO_4$ and $LiCF_3SO_3$.

The electrolytic solution can include additional solvents. Typically, the additional solvents are organic solvents. Examples of organic solvents include cyclic carbonates, chain carbonates, ethers, esters, alkoxy alkanes and phosphates.

Examples of cyclic carbonates include ethylene carbonate and propylene carbonate.

Examples of chain carbonates include dimethyl carbonate, diethyl carbonate and ethylmethyl carbonate.

Examples of ethers include diethyl ether and dimethyl ether.

Examples of esters include methyl propionate, ethyl propionate, methyl butyrate and gamma butyrolactone.

Examples of alkoxy alkanes include dimethoxy ethane and diethoxy ethane.

Examples of phosphates include triethyl phosphate and trimethyl phosphate.

Preferably, the solvent system of the electrolytic solution includes from about 2 to about 98 volume percent malonate ester having no alpha-ester hydrogen atoms.

Preferably, the molarity of the lithium salt in the electrolytic solution is from about 0.01 molar to about 3 molar, more preferably from about 0.5 molar to about 1.5 molar, and most preferably about 1 molar.

Preferably, the solvent system of the electrolytic solution includes from about 2 to about 98 volume percent of additional solvents.

The electrolytic solutions can have relatively high flashpoints. A one molar solution of $LiPF_6$ in mixture of dimethyl diethylmalonate, dimethyl carbonate and ethylene carbonate (10:40:50 volume ratio) has a flashpoint of about 29° C. A one molar solution of $LiPF_6$ in a mixture of dimethyl diethylmalonate, dimethyl carbonate and ethylene carbonate (25:25:50 volume ratio) has a flashpoint of about 37° C. A one molar solution of $LiPF_6$ in a mixture of dimethyl diethylmalonate and ethylene carbonate (50:50 volume ratio) has a flashpoint of about 62° C. The flashpoints were measured according to the Pensky-Martens closed cup method.

The electrolytic solutions can have relatively low freezing points as measured using differential scanning calorimetry. A one molar solution of $LiPF_6$ in a mixture of diethyl dimethylmalonate, dimethyl carbonate and ethylene carbonate (10:40:50 volume ratio) has a melting point of about −26° C. A one molar solution of $LiPF_6$ in a mixture of diethyl diethylmalonate, dimethyl carbonate and ethylene carbonate (10:40:50 volume ratio) has a melting point of about −28° C. A one molar solution of $LiPF_6$ in a mixture of dimethyl diethyl carbonate, dimethyl carbonate and ethylene carbonate (10:40:50 volume ratio) has a melting point of about −28° C. The freezing points measured by differential scanning calorimetry represent the lowest temperature at which a peak corresponding to a transition from the solid phase appears.

Cathode 16 can include an active cathode material that becomes lithiated during discharge of battery 10. A material that can become de-lithiated during battery use includes lithium metal oxide.

Anode 12 can include a material suitable for use as an anode in a lithium ion battery. For example, anode 12 can include a substrate having a coating of anode material disposed thereon.

The anode material can include an active anode material and a binder. The binder can be, for example, a polymeric binder. The active anode material can include lithium, carbon, graphite, an acetylenic mesophase carbon, coke, a polyacenic semiconductor, a metal oxide and/or a lithiated metal oxide.

The active anode material and binder can be mixed to form a paste which can be applied to the substrate of anode 12.

Separator 20 can be formed of any of the standard separator materials used in lithium ion batteries. For example, separator 20 can be formed of polypropylene, polyethylene, a polyamide (e.g., a nylon), a polysulfone and/or a polyvinyl chloride.

Separator 20 preferably has a thickness of from about 0.1 millimeters to about 2 millimeters, and more preferably from about 0.2 millimeters to about 0.5 millimeters.

Separator 20 can be cut into pieces of a similar size as anode 12 and cathode 16 and placed therebetween as shown in the figure. Anode 12, cathode 16 and separator 20 can then be placed within case 22 which can be made of a metal such as nickel or nickel plated steel, or a plastic such as polyvinyl chloride, polypropylene, a polysulfone, ABS or a polyamide.

Other configurations of battery 10 can also be used, including the coin cell configuration or the classic (Leclanche) configuration.

Case 22 containing anode 12, cathode 16 and separator 20 can be filled with the electrolytic solution and subsequently sealed with cap 24 and annular insulating gasket 26.

Other embodiments are in the claims.

What is claimed is:

1. A lithium battery, comprising:
   a cathode that becomes lithiated during discharge of the lithium battery;
   an anode;
   a separator disposed between the cathode and the anode; and
   an electrolytic solution comprising a malonate ester having no alpha-carbon hydrogen atoms.

2. The lithium battery of claim 1, wherein the malonate ester is selected from the group consisting of diethyl dimethylmalonate, diethyl diethylmalonate, dimethyl diethylmalonate and dimethyl dimethylmalonate.

3. The lithium battery of claim 2, wherein the electrolytic solution further comprises a chain ester.

4. The lithium battery of claim 3, wherein the electrolytic solution further comprises a cyclic ester.

5. The lithium battery of claim 4, wherein the chain ester comprises dimethyl carbonate and the cyclic ester comprises ethylene carbonate.

6. The lithium battery of claim 1, wherein the electrolytic solution further comprises a cyclic ester.

7. The lithium battery of claim 1, wherein the electrolytic solution further comprises an organic solvent.

8. A method of preparing a battery, comprising:
   incorporating an electrolytic solution including a malonate ester having no alpha-carbon hydrogen atoms into the battery.

9. The method of claim 8, wherein the malonate ester is selected from the group consisting of diethyl dimethylmalonate, diethyl diethylmalonate, dimethyl diethylmalonate and dimethyl dimethylmalonate.

10. The method of claim 9, wherein the electrolytic solution further comprises a chain ester.

11. The method of claim 10, wherein the electrolytic solution further comprises a cyclic ester.

12. The method of claim 11, wherein the chain ester comprises dimethyl carbonate and the cyclic ester comprises ethylene carbonate.

13. The method of claim 8, wherein the electrolytic solution further comprises a cyclic ester.

14. The method of claim 8, wherein the electrolytic solution further comprises a solvent selected from the group consisting of lactones, ethers and phosphates.

15. The method of claim 8, wherein the battery comprises an electrode that becomes lithiated during discharge of the battery.

16. A battery, comprising:

a cathode;

an anode;

a separator disposed between the cathode and the anode; and an electrolytic solution comprising a malonate ester having no alpha-carbon hydrogen atoms.

17. The battery of claim 16, wherein the malonate ester is selected from the group consisting of diethyl dimethylmalonate, diethyl diethylmalonate, dimethyl diethylmalonate and dimethyl dimethylmalonate.

18. The battery of claim 17, wherein the electrolytic solution further comprises a chain ester.

19. The battery of claim 18, wherein the electrolytic solution further comprises a cyclic ester.

20. The battery of claim 19, wherein the chain ester comprises dimethyl carbonate and the cyclic ester comprises ethylene carbonate.

21. The battery of claim 16, wherein the electrolytic solution further comprises a cyclic ester.

22. The battery of claim 16, wherein the electrolytic solution further comprises a solvent selected from the group consisting of lactones, ethers and phosphates.

23. An electrolytic solution, comprising a malonate ester having no alpha-carbon hydrogen atoms, wherein the electrolytic solution is within a battery.

24. The electrolytic solution of claim 23, wherein the malonate ester is selected from the group consisting of diethyl dimethylmalonate, diethyl diethylmalonate, dimethyl diethylmalonate and dimethyl dimethylmalonate.

25. The electrolytic solution of claim 24, wherein the electrolytic solution further comprises a chain ester.

26. The electrolytic solution of claim 25, wherein the electrolytic solution further comprises a cyclic ester.

27. The electrolytic solution of claim 26, wherein the chain ester comprises dimethyl carbonate and the cyclic ester comprises ethylene carbonate.

28. The electrolytic solution of claim 23, wherein the electrolytic solution further comprises a cyclic ester.

29. The electrolytic solution of claim 23, wherein the electrolytic solution further comprises a solvent selected from the group consisting of lactones, ethers and phosphates.

30. The electrolytic solution of claim 23, wherein the eletrolytic solution is entirely contained within the battery.

31. The electrolytic solution of claim 23, wherein the battery comprises an electrode that becomes lithiated during discharge of the battery.

* * * * *

UNITED STATES PATENT AND TRADEMARK OFFICE
CERTIFICATE OF CORRECTION

PATENT NO. : 6,045,950
DATED : April 4, 2000
INVENTOR(S) : Hoa Chang

It is certified that error appears in the above-identified patent and that said Letters Patent is hereby corrected as shown below:

Title Page,
Under References Cited,
4,720,439  1/1988  Tarascon...........................................429/194
Delete "1988" and insert --1987--

5,478,673  12/1995  Funatsu...........................................439/197
Delete "439" and insert --429--

Signed and Sealed this

Seventeenth Day of July, 2001

Attest:

NICHOLAS P. GODICI
Attesting Officer  Acting Director of the United States Patent and Trademark Office